United States Patent
Choudhury et al.

(10) Patent No.: US 8,666,317 B2
(45) Date of Patent: Mar. 4, 2014

(54) FREQUENCY BAND SELECTION

(75) Inventors: Sayantan Choudhury, Berkeley, CA (US); Chittabrata Ghosh, Union City, CA (US); Klaus Doppler, Albany, CA (US)

(73) Assignee: Nokia Corporation, Espoo (FI)

(*) Notice: Subject to any disclaimer, the term of this patent is extended or adjusted under 35 U.S.C. 154(b) by 328 days.

(21) Appl. No.: 13/242,624

(22) Filed: Sep. 23, 2011

(65) Prior Publication Data

US 2013/0078924 A1    Mar. 28, 2013

(51) Int. Cl.
*H04B 15/00* (2006.01)
*H04B 17/00* (2006.01)

(52) U.S. Cl.
USPC ............................................................ 455/62

(58) Field of Classification Search
USPC ............... 455/62, 509, 464, 452.1, 453, 434, 455/67.11; 370/328, 329, 252, 230, 235, 370/322, 432
See application file for complete search history.

(56) References Cited

U.S. PATENT DOCUMENTS

| | | | | |
|---|---|---|---|---|
| 8,509,802 B2* | 8/2013 | Li et al. | ........................ | 455/453 |
| 2002/0114286 A1* | 8/2002 | Iwamura et al. | ............... | 370/252 |
| 2007/0263583 A1* | 11/2007 | Hyon et al. | ................... | 370/338 |
| 2008/0050093 A1* | 2/2008 | Koga et al. | ...................... | 386/95 |
| 2011/0199926 A1* | 8/2011 | Zheng et al. | .................. | 370/252 |

* cited by examiner

*Primary Examiner* — Sujatha Sharma
(74) *Attorney, Agent, or Firm* — Harrington & Smith

(57) ABSTRACT

There is provided a method including obtaining, by a database entity, a-priori channel occupancy rate information of at least one channel from at least one of an entity of a primary system and an entity of a secondary system, wherein a database of the database entity includes information on white space channels, and availing the channel occupancy rate information to the secondary users in order to assist the secondary user to select a channel from the database.

20 Claims, 4 Drawing Sheets

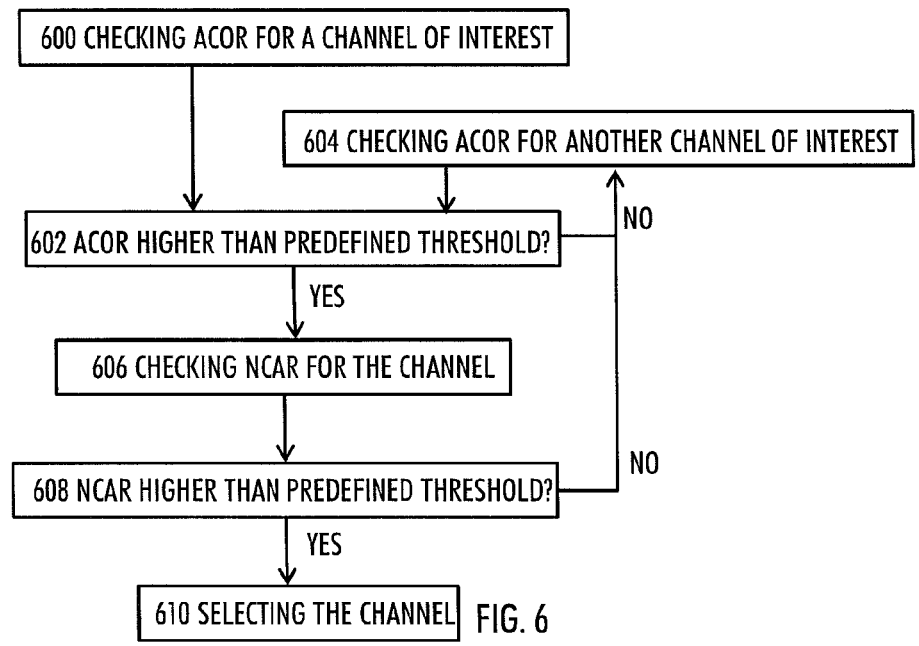
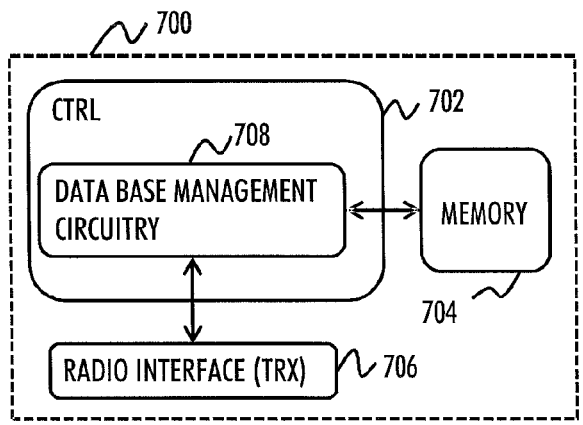
FIG. 7
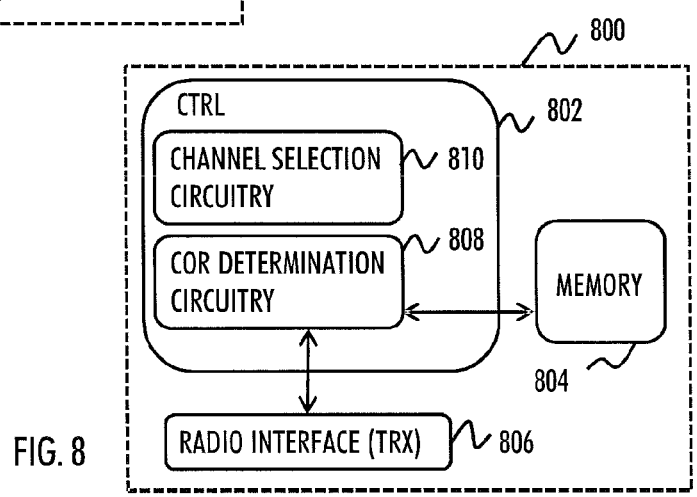
FIG. 8

FREQUENCY BAND SELECTION

FIELD

The invention relates generally to mobile communication networks. More particularly, the invention relates to a selection of frequency band from a frequency spectrum.

BACKGROUND

Modern wireless telecommunication systems aim to efficient utilization of the available frequency spectrum so as to maximize capacity and throughput. Multiple systems or subsystems may even be allocated to share a common frequency band which is shared in a dynamic manner between the systems. Recently white spaces or frequency "holes" have become increasingly available for example in TV bands due to the development from analog to digital broadcasting. White space or a frequency "hole" denotes space in the frequency spectrum which is geographically and/or temporarily available for secondary users. On the other hand, black space may refer to a frequency space that is not totally free, but which may be used by a secondary user in some situations. In order to ease the selection of a channel by the secondary user, a database is available. The database comprises information related to the channels. However, even with the aid of the current database, the selection of a channel from the frequency space may result in poor performance for the secondary user. Therefore, an improved solution is needed.

BRIEF DESCRIPTION OF THE INVENTION

Embodiments seek to improve the performance of communication.

According to an aspect of the invention, there are provided methods as specified in claims 1 and 4.

According to an aspect of the invention, there are provided apparatuses as specified in claims 10 and 13.

According to an aspect of the invention, there is provided a computer program product as specified in claim 19.

According to an aspect of the invention, there is provided an apparatus comprising means configured to perform any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents an example communication network in which the embodiments may be applied;

Figure 1A:
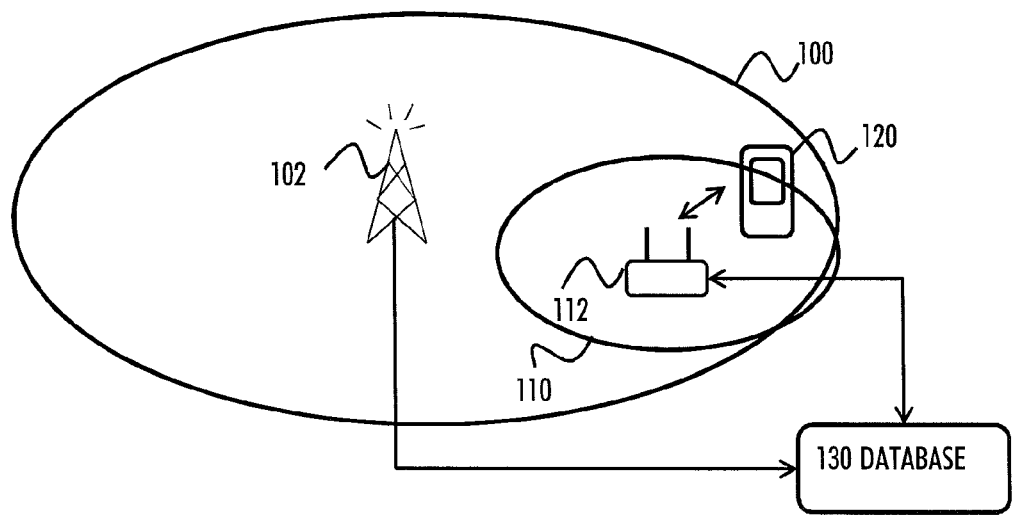

FIG. 5 presents different possibilities for providing the channel occupancy rate information according to some embodiments;

FIG. 6 depicts a block diagram for selecting a channel according to an embodiment;

FIG. 7 illustrates an apparatus according to an embodiment; and

FIG. 8 shows an embodiment according to an embodiment.

DESCRIPTION OF EMBODIMENTS

The following embodiments are examples. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

TV broadcast stations provide TV coverage to end users. It is important that the broadcast is seamless so that the users do not receive interrupted TV broadcast. There are also other radio communication elements which provide transmission at certain bandwidths and which require seamless data transmission, such as wireless microphones, elements facilitating public safety, etc. Due to the recent transition to digital TV broadcasting, substantial amount of vacant spectrum have been unleashed temporarily and/or spatially for example in the very high frequency (VHF, 30 to 300 MHz) and in the ultrahigh frequency (UHF, 300 to 3000 MHz) bands of the radio frequency spectrum. These vacant bands, irrespective of the frequency, may collectively be termed as white spaces (WS) or TV white spaces. The TV broadcasters and other licensed incumbents, such as the wireless microphones, public safety related network elements, etc., may have primary access to the channels of the white space. These users of the frequency spectrum may thus be called primary users. However, when the channels are not in use, the WS may be opportunistically used for wireless broadband data transmission, for example, by so called secondary users without imposing severe interference to the licensed, primary users. The secondary users may also be denoted as users without priority in the frequency band. It should be noted that it is important that the primary users are not interfered by the secondary users.

In addition or instead of the white space, black space may also exists and be available for the secondary users. The black space may refer to space that is not free from primary users, but which may be used by the secondary users in some situations. For example, when the signal strength of the primary users is strong, the interference from the secondary users may not be considered significant by the primary user even if occupying the same frequency band. Even though the following description concentrates on usage of the white space for the sake of clarity, the black space may be similarly used according to at least some of the embodiments.

This opportunistic access is restricted by the Federal Communications Commission (FCC)'s released Report and Order (FCC R&O) on Nov. 14, 2008. Currently there is an ongoing active standardization effort for wireless broadband usage in the WS, wherein the white space would be available for several communication protocols, including the IEEE 802.11af (wherein IEEE 802.11 is a set of standards for implementing wireless local area network (WLAN, also known as WiFi) and "af" is the task group for developing a solution for the WLAN users to take advantage of the TV WS) and the IEEE 802.22, which is a standard for Wireless Regional Area Network (WRAN) using white spaces in the TV frequency spectrum. Furthermore, it is possible that in the cellular radio access technologies (RATs), such as the LTE-Advanced, are also deployed to take advantage of the white spaces. According to the rules governed by the FCC, the unlicensed wireless devices (secondary users, such as mode II devices in the IEEE 802.11 of standard and consumer premise equipment (CPEs) in IEEE 802.22 standard) may have access to a white space database (WSD) in order to obtain a list of unoccupied (available) channels for unlicensed usage. In other words, these are the channels that the primary users are not occupying at the moment in that geographical area. Similar database ideas may exist for the black space or in other heterogeneous wireless network access scenarios as well. For example the concept of an authorized shared access (ASA) has been proposed for co-existence of different wireless technologies.

A general communication scenario to which embodiments of the present invention may be applied is illustrated in FIG. 1A. Referring to FIG. 1A, at least two systems are located such that their coverage areas overlap at least partly and that they may be configured to operate on a common frequency band. For example, a first system may be a television (TV) broadcast system comprising a broadcast tower 102 broadcasting television channels on some channels of the common frequency band to a certain geographically limited area 100. The first system may, however, be any other radio system, such as a system including a wireless microphone transmitter or a cellular network, such as such as at least one of the following: Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE) and/or the LTE-Advanced (LTE-A) of the $3^{rd}$ Generation Partnership Project (3GPP). Thus, the embodiments are not limited to the TV system. In general, the first system may be any other system having a frequency band that may be shared with a second system and that may become fragmented through the frequency utilization of the first system. In an embodiment, the first system is a primary user system. In a broad sense, the first system may be any system operating on a licensed, on an unlicensed or on a license-exempt frequency band, e.g. the Industrial, Scientific, and Medical (ISM) band.

The second system, which may be called a secondary system, a secondary user system or a system for users without priority with respect to frequency band, may be, for example, a broadband communication system, such as the worldwide Interoperability for Microwave Access (WiMAX), IEEE 802.11-based network (e.g. IEEE 802.11n, 802.11af, or 802.11ac), or IEEE 802.22-based network. The broadband system may comprise a network element 112 as an access point, such as a base station providing broadband radio coverage to a cell 110 and providing a client station 120 (which may be also called a terminal device, user equipment (UE) or a mobile station), such as a cell phone, a tablet or a laptop with uni- or bidirectional wireless communication services. The broadband system may also utilize frequency channels on the common frequency band, that is, the frequency bands of the white space or the black space spectrum. However, the second system may also be system employing Bluetooth communication, for example. In some embodiments the second system employs ad-hoc communication capabilities, such as machine-to-machine, device-to-device, or peer-to-peer communication. in that case, the devices of the second system may be LTE devices, for example. For the sake of clarity, however, let us assume that the first system (primary user system) is a TV broadcasting system and the second system (secondary user system) is a WLAN system. Therefore, in the following description, let us refer to the first system as the primary (user) system and to the WLAN system as the secondary (user) system.

However, it should be noted that the frequencies may also be available without any assigned primary user, e.g. their utilization may be based on cognitive radio access schemes. In other words, even though the description assumes a primary user existing, at least some of the embodiments may be applied to the co-existence of users with equal priority (e.g. in the ISM band). There may be a case when there is no primary users but a coexistence among the secondary users and the secondary users share the spectrum.

However, in some embodiments, the first system is a primary system or a primary user system having a priority over the frequency bands. The secondary system may then be configured to dynamically adapt to the spectrum utilization of the primary system and occupy a frequency band not used by the primary system in a given geographical area. In such embodiments, there may be rules for the secondary system (or the secondary user system) to ensure minimization/lack of interference towards the primary system, and these rules may require access to information on free frequency bands in each geographical area and/or sensing and use of specified maximum transmit power levels. Such information on the free frequency bands may be stored in a database 130 to which the network element 112 and/or the client station 120 has access. The database 130 may store information regarding at least one of the number of protected channels, geo-location and channel contours of each broadcast/transmit tower, terrain elevation for the service region, transmission powers and maximum equivalent isotropically radiated power (EIRP) for each of the channels, antenna height and gain, and propagation models. Access to the database 130 may provide information about the list of unoccupied and available channels at a given instant of time. This information may aid the secondary users to select an appropriate channel without causing interference to the users of the primary system, i.e. the primary users. The network element 112 and/or the client station 120 may obtain the information on the free frequency channels either directly or indirectly through any other node that has access to the database 130. For example, a client station may have a direct access to the database 130 to retrieve the current channel allocation in the area of the client station 120, or it may request the access point 112 or another network element to retrieve the contents of the database 130.

The database 130 may be updated by the primary users or, in some embodiments, by the secondary user. However, it is also possible that the database 130 is updated by a regulator authority, for example. An update may be needed when the channel allocation or the used transmission power changes, for example. Then the secondary users, such as the network element 112 and/or the client station 130, may periodically (or constantly or upon notification of a change in the contents of the database 130) monitor the database 130 for an updated channel allocation and take measures to adjust its own frequency allocation accordingly.

Figure 1B:
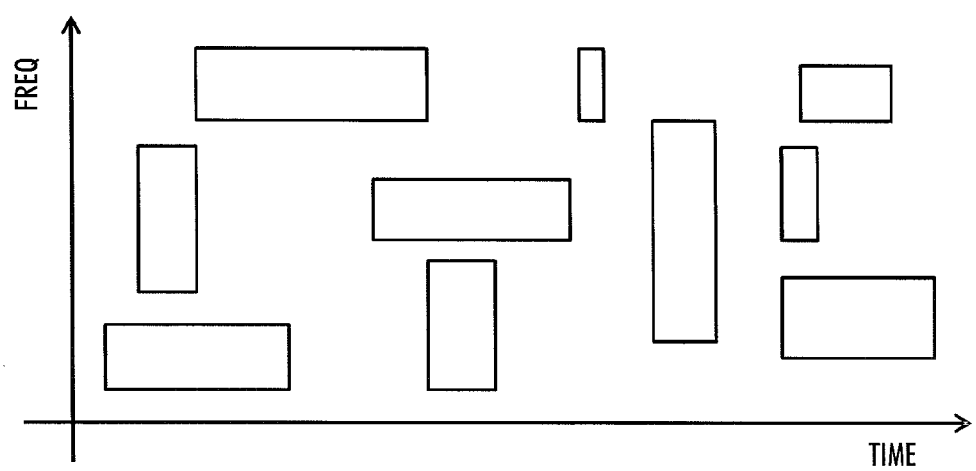

As shown in FIG. 1B, spectrum utilization of the white spaces or unlicensed bands, e.g. the ISM band, may be fragmented in both time and frequency. The irregular spectrum occupation is illustrated by the boxes in FIG. 1B. The primary system may occupy different frequencies based on time and location, while numerous wireless communication systems may occupy and release arbitrary frequencies on the white space bands. The database 130 may keep track of the available channels at any given time instant and thus practically depict the FIG. 1B along with various different pieces of information related to the frequency bands to the secondary user 112 and/or 120 so that the secondary user 112 and/or 120 may select a frequency "hole" which to utilize in its communication.

However, an instantaneously available channel may be frequently occupied by its licensed, primary user. Without such a-prior information, the unlicensed, secondary user, selecting this channel for wireless broadband usage, may be evicted from this selected channel quite often. For example, the secondary user may select the channel and then the primary user may decide to use the same channel for the purposes of the primary user. As a consequence, the communication of data performed by the secondary user in that channel may be terminated. In a scenario, secondary users with longer periods of transmission may be affected adversely, thereby resulting in reduced throughput of the entire unlicensed wireless network.

At least partly because of the above mentioned drawback, it is proposed to add information to the database 130 so that the secondary users may select a channel from the white space channels with a higher likelihood of making an appropriate selection. This may increase the throughput. The parameters to be added may be captured in the database 130, such as a TV white space or an authorized shared access (ASA) database, in order to assist in the channel selection and improved quality of service for the secondary users. Information of the available channels in the database 130 may be beneficial for the unlicensed, secondary usage. As pointed out, selection of an available channel within the list maybe useful from the performance point of view: effective selection may improve the network performance while inappropriate selection may decrease the network performance. The information to be included in the database 130 may provide a-priori information about the instantaneously available channels.

Therefore, it is proposed to obtain, by a database entity, a-priori channel occupancy rate information of at least one channel from an entity of the primary system and/or from an entity of the secondary system, wherein a database of the database entity comprises information on white space channels. Consequently, the database entity may avail the channel occupancy rate information to the secondary users in order to assist the secondary user to select a channel from the database. The a-priori channel occupancy rate (COR) information may be in different forms as will become clear from the embodiments described below. The a-priori denotes that the information gives an estimation of the expected channel usage. The database entity, which may be a white space database, a black space database or an ASA database, for example, may obtain the COR information from at least one user. The database entity may be a repository service entity arranged to maintain the database and information on white space channels, for example. The secondary users may also contribute in providing COR information as will become clear from the description of some embodiments.

As the database entity may obtain the channel occupancy rate information from the primary system and/or from the secondary system entity, the database may comprise information related to the primary users and/or the secondary users. The entity of a system (either the primary system or the secondary system) may be the user itself (either the primary user or the secondary user, respectively), a management entity within the system, or a management entity controlling the system, for example. In the latter case, the entity may not necessarily be part of the system itself. For instance, the operator's network management system may control several systems.

In an embodiment, the database entity is a primary user database entity, which comprises information related to the channel usage of at least the primary users. The database entity may provide the COR information (possibly along with other information included in the database) to the secondary users and/or allow the secondary users to access the database. This is advantageous so that the secondary users may obtain the COR information directly from the primary user database.

The proposed solution may allow, for example, an improved quality of service (QoS) for the secondary users since the secondary users may choose channels that have less likelihood of being occupied and also has a higher idle duration time. The solution may also provide better interference mitigation/avoidance as the introduced parameters to the database provide an indication of the observed interference in the whitespace channels. Also, if the secondary users are required to sense the white space channels before using them, the solution may provide reduced sensing time. This is because the COR information may provide an indication of which channels should be available for the required period of time. Given a limited amount of sensing time and resources, it may be advantageous to sense channels that have lower occupancy probability and/or have been idle for longer periods of time.

Further, when the secondary user is aiming to apply a black space, at least some of the embodiments may provide information on the interference level possibly experienced by the secondary user. For example, if the primary user is not using the non-vacant channel all the time, then the occupancy rate information may be taken into account by the secondary user.

Figure 2:
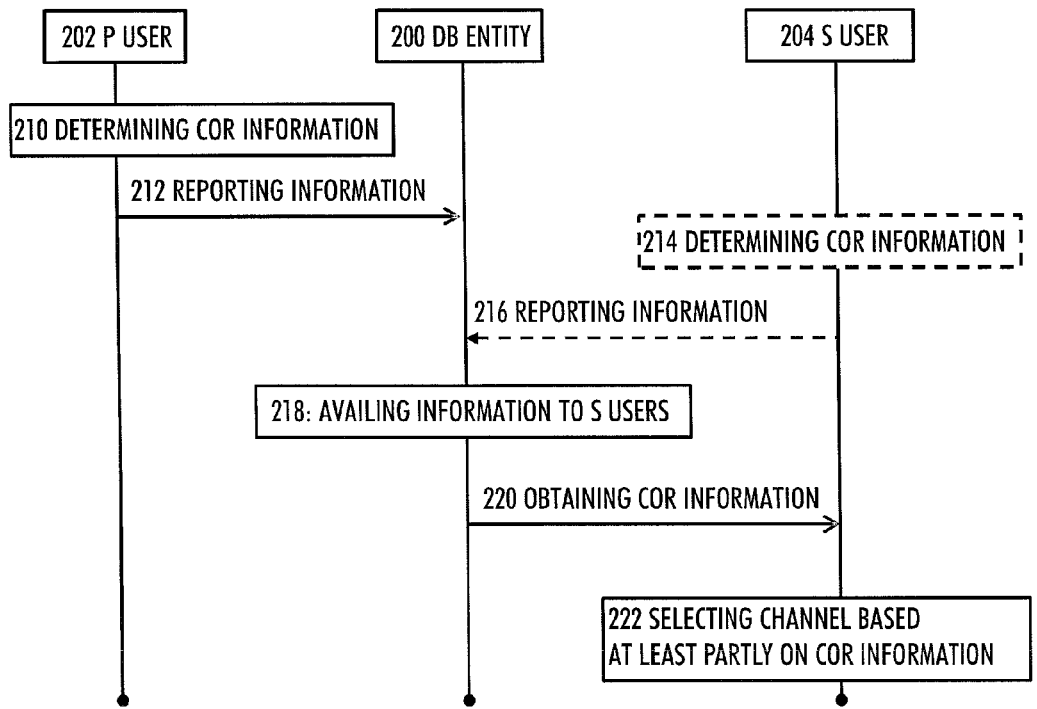
FIG. 2 shows a signaling flow diagram according to an embodiment.

Let us take a closer look to the proposed solution with respect to FIG. 2. FIG. 2 shows a signalling flow diagram according to an embodiment. In step 210, a primary user 202 determines the COR information. Even though the primary user is taken in FIG. 2 as an example entity for providing the data to a database entity 200, the entity providing the data may instead be an entity of the secondary system, for example. In this case, there may be no priority categorization between the users 202 providing the COR information and users 204 applying the COR information. However, for the sake of simplicity, the primary user is taken as the example entity.

The primary user may be a user of the primary system, such as a TV broadcast station 102 of FIG. 1 or a wireless microphone. The primary user 202 may determine the COR information which is to reported to the database entity 200 in step 212 so that the database entity 200 need not perform any further computational processing to the received COR information, but the COR values may be inserted directly to the database of the database entity 200. The database entity 200 thus manages the database, such as the database 130. Alternatively, the primary user 202 may only report certain parameters related to the COR information and the database entity 200 performs computational procedures to obtain the COR values presented in the database.

As said the COR information may represent different aspects of the channel according to embodiments. In an embodiment, the COR information comprises an average channel occupancy rate (ACOR) indicating the likelihood of the channel being occupied by the primary and/or the secondary system at a given time instant (free, high, medium, low, or in %, for instance). The channel may be occupied by the primary user belonging to the primary system, for example. Thus, this parameter captures the likelihood of a channel being occupied at any given time instant or over a given time period. In other words, channels that have a higher likelihood of being occupied at a certain time instant or time period may have a higher value of ACOR (or lower if it is inversely related).

The ACOR parameter may further be used to estimate the likelihood of a channel being free for a certain amount of time. This means that based on the average channel occupancy rate, it may be possible to infer the likelihood that a channel is free for a certain amount of time. For example if the arrival rate is modelled by a Poisson distribution, the inter-arrival time (time when the channel is free) is given by an exponential distribution. Poisson process is well known to a skilled person and thus the details of it are not described here. Thus, the secondary user 204, such as the base station 112 and/or the client station 120 of FIG. 1, selecting a channel from the white space channels may advantageously apply the ACOR parameter predict the likelihood that a channel is free for a certain amount of time. For instance, a secondary user 204 may be more likely to choose a channel that has a higher likelihood of being free for a certain period of time. The ACOR information may be obtained at least from the at least one primary user but optionally also from certain secondary users, as will become clear from the embodiments below.

In an embodiment, one frequency band comprising one or more channels is licensed to only one primary system. The primary system may comprise an entity (like a network management system) which takes care of informing its usage to the database. In an embodiment when more than one primary user is allowed to access a channel, the primary (and/or secondary) user density might also be of use for the secondary user. In this case, the database may cover also parameters indicating for example how many primary users are present on one channel, are they the same or different type.

Figure 3A:
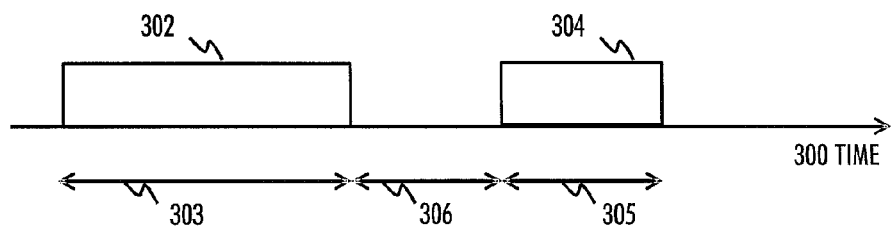
FIG. 3 shows possible types of channel occupancy rate information according to some embodiments.

Looking at FIG. 3A now, the Figure illustrates a channel usage over a time line 300. Blocks 302 and 304 indicate that a specific primary user 202 utilizes the channel. The duration for each usage 302 and 304 of the channel is shown with reference numeral 303 and 305 respectively. The time duration 306 depicts a period when the channel is idle. Let us refer to time durations 303 and 305 as t1 and t2, the time duration 306 as and the total time duration for the observance period as t. Then the primary user (or a secondary user) may, in an embodiment, determine the COR information by applying the following equation: $(t_1+t_2)/t$, that is, the ratio of the time the channel is occupied to the duration interval t.

In an embodiment, the COR information comprises a neighbor channel availability rate (NCAR) information indicating the likelihood of at least one adjacent channel, in addition to the channel of interest, being occupied by the primary and/or the secondary system at a given time instant (free, high, medium, low, or in %, for instance). The channel of interest represents the channel the secondary user is targeting to utilize when the secondary user accesses the database for channel selection purposes. In an embodiment, the NCAR captures the likelihood that two or more channels, including the channel of interest, are unoccupied, i.e. not used by primary users (and/or potentially by the secondary users), at any given time instant or a given time period.

By knowing the adjacent channel occupancy, the secondary user selecting an appropriate channel from the database may perform more sophisticated selection which results in improved performance, for example. The secondary use may decide not to select a free channel which is neighboring an occupied channel, for instance. The transmission power for each channel, which information may also be carried in the database, is also of use when the secondary users decide on channel selection.

An example application where the NCAR parameter may be useful comprises customer-premises equipment (CPEs) in the IEEE 802.22 standard. For example, the rules specified by the FCC, indicate that fixed devices may not be permitted to operate on an available channel that is adjacent to a channel currently occupied by a licensed, primary incumbent. Additionally, the mobile devices in the IEEE 802.11af standard may be allowed to operate on such an available channel with the out-of-band emission limited to 55 dB below the power at which they operate.

Figure 3B:
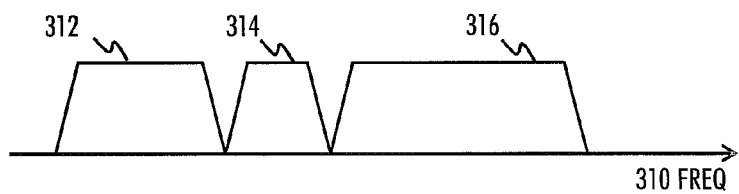

FIG. 3B shows plurality of adjacent channels 312 to 316 on a frequency axis 310. The NCAR parameter may represent the probability that all of the adjacent channels 312 to 316 are available, i.e. not occupied by any of the primary users, for example. However, the NCAR parameter may represent probability that only two adjacent channels of the plurality of channels are available. In this case the NCAR may relate to channel 312 and 314, for example.

It should be noted that if the channel occupancy rates were independent for each channel, the average occupancy rate might be sufficient to estimate the likelihood that two or more channels are occupied. However, the occupancy probabilities of the different channels may not be independent, as known by a skilled person, and hence, the joint statistical information in the form of the neighbor channel availability rate may be useful. The computation of the NCAR parameter may utilize the well-known Poisson normal approximation and Beta distribution, for example, which may take the obtained ACOR parameters into use. Alternatively or in addition to, based on the reporting from the primary users, the database may compute the NCAR similarly as it computes the ACOR.

As the primary users 202 of FIG. 2 may need to report their channel usage to the database entity 200, the calculation of the ACOR and/or NCAR parameters for the primary users 202 is relatively straightforward. For instance, referring to FIG. 3A, every time the primary user 202 accesses a particular channel, a counter may be started and the counter may be stopped when the primary user 202 stops using the channel. This way the parameters $t_1$ and $t_2$ may be obtained. The time average of the counter over a period of time gives an indication of the likelihood that a particular channel is occupied by the primary user 202. Similarly, another counter may be started when a channel is released by the primary user 202 to obtain $t_{idle}$, and the counter may be reset when the channel is occupied again by the primary user 202. The primary user 202 may then derive the COR information by itself or let the database entity 200 perform further calculations based on the counter information. For example, the primary user 202 may register with the database entity 200 each time the primary user 202 uses a particular whitespace channel. In this option, the database entity 200 may determine the actual ACOR and/or NCAR. Alternatively, the secondary users may report its usage duration each time it uses a whitespace channel (e.g. [start_time, end_time]). Also here the database may calculate the statistics. Alternatively, the users 202 (and 204) may provide ready-to-use values for the database entity 200 by performing the calculation by itself.

As a consequence, the primary user may determine in step 210 of FIG. 2 the channel occupancy rate information (either ACOR or NCAR, or both) for a specific channel by monitoring, over a certain period of time, each duration the channel is being occupied by the primary user. Similarly, in an embodiment, where the secondary users 204, instead of the primary user 202 or in addition to the primary user 202, report COR information to the database entity 200 in step 216, the secondary user may determine, in step 214, the channel occupancy rate information (either ACOR or NCAR, or both) in the same way as the primary user does. As a consequence, the user 202 (and 204) may report the determined information to the database entity 200 in step 212 or 216.

The reporting in step 212 (and optionally in step 216) may take place periodically so that the user periodically transmits the COR data to the database entity 200. This option allows for up-to-date database as the users 202 and 204 are forced to transmit the COR information at certain intervals. Alternatively or in addition to, the users 202 (and 204) may transmit COR information each time the user utilizes any of the white space channels or per request from the database entity 200.

As the database entity 200 obtains the COR values (either in a ready-to-be-used form or after further processing), the database entity 200 may avail the COR information to the secondary users in step 218. As a result, the secondary user 204 obtains a-priori channel occupancy rate information of at least one channel with respect to at least one primary and/or secondary user from the database entity 200 in step 220. The information may be transmitted from the database entity 200 to the secondary user 204 either directly or indirectly via a third network element, for example. After obtaining the COR information the secondary user 204 may select an available channel from the database based at least partly on the channel occupancy rate information. As said earlier, the database may comprise numerous information pieces regarding the white space channels in addition to the COR information, and the secondary user 204 may naturally utilize such other information when making the selection of an appropriate channel to use. The metrics of duration of availability (ACOR) and the probability of adjacent channel occupancy (NCAR) may assist in selection of available channels, thereby, resulting in increased throughput of the unlicensed wireless networks as well as mitigating interference with adjacent licensed users. Further, the information may influence positively the quality of service guarantees of varying services generated by the unlicensed users. The access Points and devices will obtain information for improved interference handling and QoS. In other words, the database, such as the white space database and/or the ASA database, may provide additional service to access points and devices.

Figure 4:
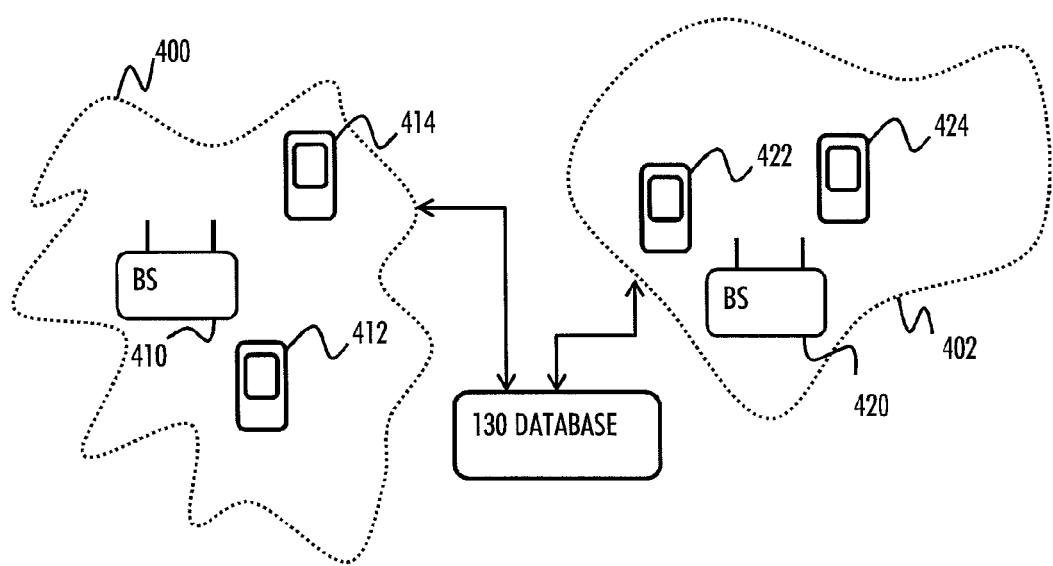
FIG. 4 illustrates grouping of secondary users according to an embodiment.

In an embodiment, the secondary devices may be categorized into different classes or groups, for example to classes A, B, C etc. The categorization may be performed by the database, for example. Alternatively or in addition to, the categorization may be performed by other, possibly external, regulatory authorities. For example, it may be possible that only a few wireless technologies are allowed in these bands (LTE, WiFI, etc.). Such a categorization may depend on the wireless technology the secondary uses are applying. The categorization is shown in FIG. 4, where the groups 400 and 402 represent two groups of secondary users. For instance, group 400 may comprise LTE devices 410 to 414 performing machine-to-machine communication in a specific geographical location and the group 402 may be 802.11n devices 420 to 424 in the same or different geographical location. Further or instead, the categorization may depend on prioritized access the secondary users may have. More particularly, in an embodiment, the wireless networks using whitespaces (or other unlicensed bands) may have different prioritized classes or groups of secondary users where one class of secondary devices are given preferential access to the wireless spectrum compared to other classes. The primary user or a prioritized secondary user may authorize usage of the spectrum for non-prioritized usage, for example by using the authorized shared access (ASA) database. The prioritization of certain secondary users may depend on the requirements of data transfer of the secondary user, the regulation of the authorities in the geographical location, etc. Further, it may also be possible to allow prioritized access to wireless devices using the same technology, e.g. the LTE devices 410 to 414. By having the secondary users divided into different groups 400 and 402, the COR information may be determined separately for each group 400 and 402. For example, there may be two sets of channel occupancy rates and neighbor channel availability rates, one for the 802.11n devices 420 to 424 and other for the LTE devices 410 to 414.

This way the database entity 200 may obtain the channel occupancy rate information (ACOR and/or NCAR) from at least one of the groups 400 and 402 of the secondary users 410 to 424. This is also shown in FIG. 2 in steps 214 and 216 with dashed lines. However, as the group of secondary user providing information to the database may be a prioritized secondary user group, the database 130 may be, in an embodiment, seen as the primary user database. As a result, the database entity may avail the channel occupancy rate information from the at least one group 400 and 402 to the secondary users 410 to 424 and the secondary user may obtain the a-priori channel occupancy rate information of at least one channel with respect to at least one specific group 400 and 402 of secondary users 410 to 424. This option may allow the secondary users to obtain knowledge of other groups of secondary users and avoid interfering with them when making the channel selection. Further, this embodiment may allow the secondary users belonging to a specific group to know the channel usage information a-priori in that specific group, thereby improving the capabilities of the secondary user to make a selection so that the other users in the group most likely do not get interfered or do not interfere with the secondary user making the selection. In addition, the categorization may allow to separate users into groups based on radio access technology they are using. For example, it may be that some technologies are more "compatible" with each other. For example the co-existence of Wifi with another system using carrier sensing is easier than the co-existence with a framed system like the LTE. The categorization thus provides a possibility to inform the other users which radio access technology is occupying which channel(s).

Thus, the secondary users may also provide the COR information to the database in addition to or instead of the primary users. However, the tabulation of the COR information, such as the ACOR and the NCAR, for the secondary users may not be as straightforward as for the primary users because the secondary users may not need to report its usage patterns to the database. In an embodiment, it is proposed that the secondary users register with the database each time the secondary user uses a particular whitespace channel or report its usage duration either each time the secondary user utilizes the whitespace channel or according to regular intervals, for example (i.e. similar to a primary user)). As said earlier, it is also possible that the devices (primary or secondary) themselves calculate the statistics over a given period of time and report it to the database. In an embodiment, the reporting is made periodically.

Figure 5A:
Figure 5B:
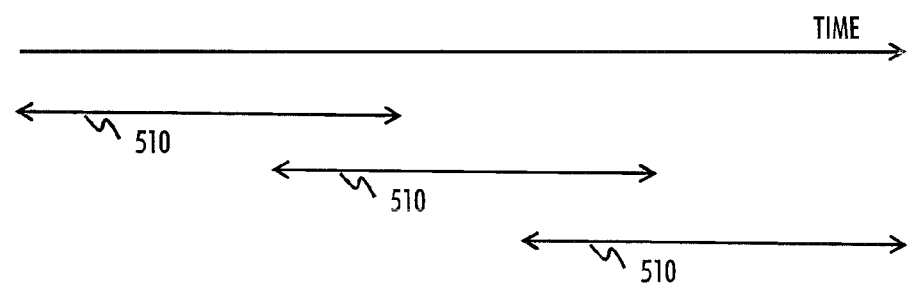

In an embodiment, as shown in FIGS. 5A and 5B, the providing of COR information may be time-based. For example, the channel occupancy rate may be provided either separately for a plurality of non-overlapping time windows 500 to 504, as shown in FIG. 5A, or for a sliding time window 510 of certain time duration, as shown in FIG. 5B. For example, the ACOR (and similarly the NCAR) may be calculated over certain time periods 500 to 504, e.g. for each hour within 24 hours, providing 24 values which are tabulated in the database. The estimates for each hour may be updated periodically, for example on a daily basis. Although the time durations 500 to 504 are shown to be of equal length, it is possible to have different durations. This could be useful when certain times of a day are observed to follow similar channel usage statistics, such as night times in rural areas. Then the ACOR or NCAR information for the entire night may be provided by one value, thus saving database resources.

Another implementation shown in FIG. 5B is to use a flexible time window 510 over which to estimate the parameters and update it accordingly. For example a short time window of 15 minutes may be used to estimate the likelihood that the channel is free for the next 15 minutes and so on. Then the secondary user accessing the database in the need of channel for the next 10 minutes for example may advantageously select a channel that has a high likelihood of being free for the period.

FIG. 6 presents a diagram for the channel selection by the secondary user 204 of FIG. 2. The diagram shown in FIG. 6 may be seen as a possible implementation of step 222 of FIG. 2. In FIG. 6, the secondary user may in step 600 check the ACOR for a channel of interest. The channel of interest may be a channel the user desires to utilize. There may be several channels that are suitable for the secondary user and thus the user may first select one of the channels of interest. This selection of a "candidate" channel may depend on the requirements of the data communication, such as the need of bandwidth (which may vary between different channels), and the capabilities of the secondary user with respect to radio interface components, for example.

In step 602, the secondary user may compare the ACOR of the candidate channel with a predefined threshold. The predefined threshold may be known from past statistics of the network and/or from criteria set by the secondary user selecting the channel for example. If the comparison reveals that the ACOR is not higher (or lower, if inverse is applied) than the threshold, then it may be determined that the channel under check may not be suitable for the selection as it may not provide enough reliability, for example. As a consequence, the method proceeds to step 604 where another channel of interest is selected as the candidate channel and the comparison in step 602 is performed with respect to this candidate channel. However, if the comparison in step 602 reveals that the ACOR is in fact higher than the threshold, then the method may proceed in step 606.

In step 606 the secondary user may check the NCAR of the channel and in step 608 the secondary user may compare the NCAR of the candidate channel with a predefined threshold. Again, the predefined threshold may be known from the past statistics of the network and/or from criteria set by the secondary user selecting the channel, for example. If the secondary user needs to have the channel for its use for a long period of time for carrying out high security traffic, the threshold may be set high, for example. If the comparison reveals that the NCAR is not higher (or lower, if inverse is applied) than the threshold, then it may be determined that the channel under check may not be suitable. As a consequence, the method proceeds to step 604 where another channel of interest is selected as a candidate channel and the comparisons in steps 602 and 608 are performed with respect to this newly selected candidate channel. However, if the comparison in step 608 reveals that the ACOR is in fact higher than the threshold, then the method may proceed in step 610, where the secondary user may decide to select the candidate channel as the channel to be utilized in the purposes of the secondary user. Naturally, either ACOR or NCAR may not be observed at all, if the COR information does not comprise both of the COR information. In some embodiments it may not be necessary that both the ACOR and the NCAR are above thresholds. In some circumstances, only ACOR or NCAR being above the threshold may be sufficient.

In this manner, the secondary user may select the channel in step 610 from the database when at least one of the ACOR and the NCAR of the channel (=candidate channel) indicates that the channel fulfills criteria set for the secondary user channel usage, wherein at least one of the ACOR and the NCAR is comprised in the COR information obtained from the database.

Embodiments, as shown in FIGS. 7 and 8, provide apparatuses 700 and 800, each comprising at least one processor 702, 802 and at least one memory 704, 804 including a computer program code, wherein the at least one memory 704, 804 and the computer program code are configured, with the at least one processor 702, 802 to cause the apparatus 700, 800 to carry out at least some of the features illustrated in connection with FIGS. 1 to 6. It should be noted that FIGS. 7 and 8 show only the elements and functional entities required for understanding the apparatuses. Other components have been omitted for reasons of simplicity. The implementation of the elements and functional entities may vary from that shown in the Figures. The connections shown in the Figures are logical connections, and the actual physical connections may be different. The connections can be direct or indirect and there can merely be a functional relationship between components. It is apparent to a person skilled in the art that the apparatus may also comprise other functions and structures.

As said, the apparatuses 700 and 800 may each comprise the at least one processor 702 and 802, respectively. The at least one processor 702 and 802 may be implemented with a separate digital signal processor provided with suitable software embedded on a computer readable medium, or with a separate logic circuit, such as an application specific integrated circuit (ASIC). The at least one processor 702 and 802 may comprise an interface, such as computer port, for providing communication capabilities.

In an embodiment the apparatus 700 is comprised in or comprises the database entity. The apparatus 700 may be comprised in a base station (also called a base transceiver station, a Node B, a radio network controller, or an evolved Node B, for example). The apparatus 700 may alternatively be a separate network element. The apparatus 700 may comprise a circuitry, e.g. a chip, a processor, a micro controller, or a combination of such circuitries and cause the apparatus to carry out at least some of the above-described functionalities. In an embodiment, the apparatus 700 performs the required functionalities to carry out the embodiments with respect to the database entity.

The at least one processor 702 of the apparatus 700 may comprise a database management circuitry 708 for managing the database, wherein the database may be a white space database or an ASA database. The circuitry 708 may obtain the COR information from at least one user, directly or indirectly, via a radio interface (TRX) 706 and apply the data by adding it to the database. The circuitry 708 may also perform further computational procedures to the received data, if needed, before employing the data in the database. The management circuitry 708 may also provide information form the database to secondary users, when needed or simply allow the secondary users to access the database. The circuitry may thus perform access control of the database and provide evidence for the authentication of the database.

The memory 704 may be applied for storing the data received from the primary and secondary users and also to store the database. In the case the database in the ASA database, the processor 702 together with the database management circuitry 708 may keep track of authorization of the users who try to access and/or manipulate the database.

The apparatus 800 may comprise or be comprised in a terminal device (i.e. UE), e.g. a computer (PC), a laptop, a tabloid computer, a cellular phone, a communicator, a smart phone, a palm computer, or any other communication apparatus. In an embodiment, the apparatus 800 may be comprised in a base station. The apparatus 800 may alternatively be a separate network element. Further, the apparatus 800 may be or comprise a module (to be attached to the UE) providing connectivity, such as a plug-in unit, an "USB dongle", or any other kind of unit. The unit may be installed either inside the UE or attached to the UE with a connector or even wirelessly. The apparatus 800 may comprise a circuitry, e.g. a chip, a processor, a micro controller, or a combination of such circuitries and cause the apparatus to carry out at least some of the above-described functionalities.

In an embodiment, the apparatus 800 performs the required functionalities to carry out the embodiments with respect to the secondary user. In an embodiment, the apparatus 800 performs the required functionalities to carry out the embodiments with respect to the primary user.

The at least one processor 802 may comprise a COR determination circuitry 808 for determining the COR information, either the complete COR (ACOR and/or NCAR) values or information related to the COR, in which case the database entity may perform the final computational procedures. The COR may comprise at least one of the ACOR and the NCAR for each channel the user has applied or is applying.

The at least one processor 802 may also comprise a channel selection circuitry 810 for selecting a channel from the database. The selection may be performed with the aid of COR information, at least. Naturally the other information of the channels provided in the database may be of use also. In case the apparatus 800 comprises or is comprised in a primary user device, the channel selection circuitry 810 as described here may be omitted.

The memory 804 of the apparatus 800 may be for storing data related to COR information. For example, when the COR information is derived over a certain period of time and/or periodically, the memory 804 may be used in storing data before transmitting the COR data to the database entity.

The apparatuses 700 and 800 may each further comprise radio interface components 706 and 806, respectively, providing the apparatus with radio communication capabilities with the radio access network. The radio interface components may comprise standard well-known components such as amplifier, filter, frequency-converter, (de)modulator, and encoder/decoder circuitries and one or more antennas.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, according to an embodiment, the apparatus comprises means for performing the tasks of FIGS. 1 to 8. In another embodiment, the apparatus comprises processing means configured to carry out embodiments of any of the FIGS. 1 to 8. In an embodiment, the at least one processor 702, the memory 704, and the computer program code form an embodiment of processing means for carrying out the embodiments of the invention. In another embodiment, the at least one processor 802, the memory 804, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
obtaining, by a database entity, a-priori channel occupancy rate information of at least one channel from at least one of an entity of a primary system and an entity of a secondary system, wherein a database of the database entity comprises information on white space channels; and
availing the channel occupancy rate information to the secondary users in order to assist the secondary user to select a channel from the database.

2. The method of claim 1, wherein the channel occupancy rate information comprises an average channel occupancy rate indicating the likelihood of the channel being occupied by at least one of the primary system and the secondary system at a given time instant.

3. The method of claim 1, wherein the channel occupancy rate information comprises a neighbor channel availability rate indicating the likelihood of at least one adjacent channel, in addition to the channel of interest, being occupied by at least one of the primary system and the secondary system at a given time instant.

4. A method, comprising:
obtaining, by a secondary user, a-priori channel occupancy rate information of at least one channel with respect to at least one of at least one primary user and at least one secondary user from a database, wherein the database comprises information on white space channels; and
selecting an available channel from the database based at least partly on the obtained channel occupancy rate information.

5. The method of claim 4, wherein the channel occupancy rate information comprises an average channel occupancy rate indicating the likelihood of the channel being occupied by at least one of a primary system and a secondary system at a given time instant.

6. The method of claim 4, wherein the channel occupancy rate information comprises a neighbor channel availability rate indicating the likelihood of at least one adjacent channel, addition to the channel of interest, being occupied by at least one of the primary system and the secondary system at a given time instant.

7. The method of claim 4, further comprising:
obtaining a-priori channel occupancy rate information of at least one channel with respect to at least one group of secondary users, when the secondary users are categorized into groups based on at least one of the following: the radio access technologies of the secondary users and the priority access information of the secondary users.

8. The method of claim 4, further comprising:
determining the channel occupancy rate information for a specific channel with respect to the secondary user by monitoring, over a certain period of time, each duration the channel is being occupied by the secondary user; and
reporting the channel occupancy rate information to the database.

9. The method of claim 4, further comprising:
selecting a channel from the database when at least one of an average channel occupancy rate and a neighbor channel availability rate of the channel indicates that the channel fulfills criteria set for the secondary user channel usage, wherein at least one of the average channel occupancy rate and the neighbor channel availability rate is comprised in the channel occupancy rate information obtained from the database.

10. An apparatus, comprising:
at least one processor and at least one memory including a computer program code, wherein the at least one memory and the computer program code are configured to, with the at least one processor, cause the apparatus at least to:
obtain a-priori channel occupancy rate information of at least one channel from at least one of an entity of a primary system and an entity of a secondary system, wherein a database of the database entity comprises information on white space channels; and
avail the channel occupancy rate information to the secondary users in order to assist the secondary user to select a channel from the database.

11. The apparatus of claim 10, wherein the channel occupancy rate information comprises an average channel occupancy rate indicating the likelihood of the channel being occupied by at least one of the primary system and the secondary system at a given time instant.

12. The apparatus of claim 10, wherein the channel occupancy rate information comprises a neighbor channel availability rate indicating the likelihood of at least one adjacent channel, in addition to the channel of interest, being occupied by at least one of the primary system and the secondary system at a given time instant.

13. An apparatus, comprising:
at least one processor and at least one memory including a computer program code, wherein the at least one memory and the computer program code are configured to, with the at least one processor, cause the apparatus at least to:
obtain a-priori channel occupancy rate information of at least one channel with respect to at least one of at least one primary user and at least one secondary user from a database, wherein the database comprises information on white space channels; and
select an available channel from the database based at least partly on the obtained channel occupancy rate information.

14. The apparatus of claim 13, wherein the channel occupancy rate information comprises an average channel occupancy rate indicating the likelihood of the channel being occupied by at least one of a primary system and a secondary system at a given time instant.

15. The apparatus of claim 13, wherein the channel occupancy rate information comprises a neighbor channel availability rate indicating the likelihood of at least one adjacent channel, in addition to the channel of interest, being occupied by at least one of the primary system and the secondary system at a given time instant.

16. The apparatus of claim 13, wherein the apparatus is further caused to:
obtain a-priori channel occupancy rate information of at least one channel with respect to at least one group of secondary users, when the secondary users are categorized into groups based on at least one of the following: the radio access technologies of the secondary users and the priority access information of the secondary users.

17. The apparatus of claim 13, wherein the apparatus is further caused to:
determine the channel occupancy rate information for a specific channel with respect to a secondary user by monitoring, over a certain period of time, each duration the channel is being occupied by the secondary user; and
report the channel occupancy rate information to the database.

18. The apparatus of claim 13, wherein the apparatus is further caused to:
select a channel from the database when at least one of an average channel occupancy rate and a neighbor channel availability rate of the channel indicates that the channel fulfills criteria set for the secondary user channel usage, wherein at least one of the average channel occupancy rate and the neighbor channel availability rate is comprised in the channel occupancy rate information obtained from the database.

19. A computer program product embodied on a Non-transitory computer-readable media and comprising program instructions which, when loaded into an apparatus, execute the method according to claim 1.

20. A computer program product embodied on a and comprising program instructions which, when loaded into an apparatus, execute the method according to claim 4.

* * * * *